UNITED STATES PATENT OFFICE.

EDWARD W. HASLUP, OF BRONXVILLE, NEW YORK, AND BENJAMIN A. PEACOCK, OF PHILADELPHIA, PENNSYLVANIA; SAID PEACOCK ASSIGNOR TO SAID HASLUP.

PROCESS OF MAKING ALUM.

1,279,109.     Specification of Letters Patent.     Patented Sept. 17, 1918.

No Drawing.     Application filed November 7, 1917. Serial No. 200,814.

*To all whom it may concern:*

Be it known that we, EDWARD W. HASLUP and BENJAMIN A. PEACOCK, both citizens of the United States, respectively, residing at Bronxville, Westchester county, New York, and Philadelphia, Philadelphia county, Pennsylvania, have invented certain new and useful Improvements in Processes of Making Alum; and we do hereby declare the following to be a full, clear, and exact description of the invention, such as will enable others skilled in the art to which it appertains to make and use the same.

This invention relates to a process for making alkali metal alums and has for its object to produce said alums from naturally occurring minerals in a manner less costly than has been heretofore proposed.

With this and other objects in view the invention consists in the novel steps and combinations of steps constituting the process all as will be more fully hereinafter disclosed and particularly pointed out in the claims.

In carrying out this process we take green sand or other naturally occurring potassium bearing silicate, and mix the same with bauxite or other naturally occurring aluminum compound soluble in sulfuric acid, reduce the materials to a finely divided condition, as by grinding to a sixty mesh, and add sufficient sulfuric acid in excess to convert substantially all the alkali-metals present into sulfates and also sufficient to form therewith double sulfates of aluminum.

The finely divided mineral material mixed with acid of a specific gravity of say between 50° and 55° Bé., and without any free added water is next transferred to a closed receptacle or "den" whose non-metallic, non-conducting walls prevent the escape of the heat of reaction, or from which the evolved heat is otherwise prevented from escaping, and said mixture is kept in said receptacle for say twenty four or forty eight hours until the desired alum or alums have formed. The confining of the mixture in a heat insulated container without added water, causes the heats of the reaction to gradually accumulate, and the internal temperature to rise considerably above 200° C.

As this temperature rises, new reactions take place, which would not occur at all at a lower temperature, and therefore, the acid is substantially all used up on the more easily attacked constituents with the result that it is more economically employed than would be the case if said temperatures were not reached, or if free added water were present. We have found that the sulfuric acid employed should be about 54° Bé., to attain the best results.

After about twenty four hours, the potassium present will be found to be converted into the form of a sulfate and the same will be true of the aluminum. These sulfates are now extracted with water and the crude alkali-metal double sulfate of aluminum crystallized out in the usual manner or otherwise suitably recovered.

If green sand is employed we get a very satisfactory yield of potash alum at a minimum cost, and therefore, we prefer this material to any other, although, of course, alunite, feldspar, etc., can be used when desired.

It should be observed that an important feature of this invention resides in the fact that substantially no free water is added to the mineral, for the presence of free water would dilute the acid, and would therefore prevent the temperature from rising sufficiently high to cause other reactions to follow from the evolved heat. The necessary temperature could not be imparted from an outside source, for that would cause a local heating of the mass and a volatilization of the acid.

It is further important that the minerals selected should be sufficiently rich in readily attackable constituents to raise the temperature sufficiently for the secondary reactions to take place.

The necessary richness of the ores can be readily determined by calculations, or by trials, and when the ores employed are found to be thus deficient, they should be brought up to the necessary richness by the addition of readily attackable constituents such for example, as alkali-metal compounds, or minerals rich in said compounds. As a rough workable rule about 10% or 12% of readily attackable compounds present will bring about the necessary reacting temperatures.

It is obvious that those skilled in the art may vary the details of the process without departing from the spirit of the invention, and therefore, we do not wish to be limited to the above disclosures except as may be required by the claims.

What we claim is:—

1. The process of producing an alkali-metal alum from naturally occurring mineral material containing compounds of an alkali-metal and of aluminum soluble in sulfuric acid, which consists in finely dividing said minerals; mixing the latter devoid of free added water with sufficient sulfuric acid to convert the alkali-metal and the aluminum compounds into sulfates; confining the mixed acid and minerals in a closed vessel from which the heats of reaction are prevented from escaping until substantially all the alkali-metal compounds present have been transformed into sulfates; extracting the sulfates present with water; and evaporating the solution thus obtained to recover the desired alum, substantially as described.

2. The process of producing an alkali-metal alum from naturally occurring mineral material containing compounds of an alkali-metal and of aluminum soluble in sulfuric acid, which consists in finely dividing said minerals; mixing the latter devoid of free added water with sufficient sulfuric acid of substantially 54° Bé. to convert the alkali-metal and the aluminum compounds into sulfates; confining the mixed acid and minerals for more than twenty four hours in a closed vessel from which the heats of reaction are prevented from escaping, and until substantially all the alkali-metal compounds present have been transformed into sulfates; extracting the sulfates present with water; and evaporating the solution thus obtained to recover the desired alum, substantially as described.

3. The process of producing an alkali-metal alum from naturally occurring minerals which consists in mixing green sand with bauxite; finely dividing the mixture; adding sulfuric acid to the finely divided mixture; confining the mass thus obtained devoid of added free water in a closed receptacle from which the heats of reaction are prevented from escaping for a period exceeding fifteen hours; extracting the sulfates thus produced with water; and crystallizing out the desired alum, substantially as described.

4. The process of producing an alkali metal alum from naturally occurring minerals which consists in mixing green sand with bauxite; finely dividing the mixture; adding sulfuric acid of substantially 55° Bé. to the finely divided mixture; confining the mass thus obtained devoid of added free water in a closed receptacle from which the heats of reaction are prevented from escaping, for a period exceeding twenty hours; extracting the sulfates thus produced with water; and crystallizing out the desired alum from the solution thus obtained, substantially as described.

In testimony whereof we affix our signatures.

EDWARD W. HASLUP.
BENJAMIN A. PEACOCK.